(12) United States Patent
Huang et al.

(10) Patent No.: US 10,116,231 B2
(45) Date of Patent: Oct. 30, 2018

(54) DIGITAL CURRENT-SHARING LOOP DESIGN OF PSUS TO ENSURE OUTPUT VOLTAGE REGULATION DURING DYNAMIC LOAD TRANSIENTS

(71) Applicant: DELL PRODUCTS, L.P., Round Rock, TX (US)

(72) Inventors: Wen-Hung Huang, Taipei (TW); Kunrong Wang, Austin, TX (US); Yu-Mei Chen, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/461,362

(22) Filed: Mar. 16, 2017

(65) Prior Publication Data

US 2018/0269801 A1      Sep. 20, 2018

(51) Int. Cl.
*H02M 7/23* (2006.01)
*H02M 7/04* (2006.01)
*H02M 1/08* (2006.01)
*H02M 1/00* (2006.01)
*H02M 7/217* (2006.01)
*H02M 3/158* (2006.01)

(52) U.S. Cl.
CPC ............... *H02M 7/04* (2013.01); *H02M 1/08* (2013.01); *H02M 7/2173* (2013.01); *H02M 7/23* (2013.01); *H02M 2001/0009* (2013.01); *H02M 2003/1586* (2013.01)

(58) Field of Classification Search
CPC ...... H02M 1/084; H02M 1/88; H02M 3/1584; H02M 2003/1586; H02M 7/2173; H02M 7/23
See application file for complete search history.

(56) References Cited

U.S. PATENT DOCUMENTS

| 4,174,534 | A | * | 11/1979 | Kotlarewsky | ......... | H02M 3/285 363/26 |
| 4,734,844 | A | * | 3/1988 | Rhoads | .................. | H02J 1/102 323/272 |
| 7,323,794 | B2 | | 1/2008 | Gentillet et al. | | |
| 8,390,148 | B2 | | 3/2013 | Shetty et al. | | |
| 8,645,739 | B2 | | 2/2014 | Berke et al. | | |

(Continued)

OTHER PUBLICATIONS

M. B. Shamseh, A. Kawamura and T. Yoshino, "A robust equal-load-sharing control scheme for parallel UPS units with time delay consideration," 2016 IEEE 8th International Power Electronics and Motion Control Conference (IPEMC-ECCE Asia), Hefei, 2016, pp. 3453-3460.*

*Primary Examiner* — Jue Zhang
*Assistant Examiner* — Jye-June Lee
(74) *Attorney, Agent, or Firm* — Isidore PLLC (57) ABSTRACT

Power supply units (PSU) provide for digital current-sharing loop control to ensure output voltage regulation during dynamic load transients by (i) delaying an internal current signal to match a delay in a shared current signal, and (ii) controlling the output amplifier based on the shared current signal and the delayed local current signal to maintain the respective local DC electrical power in proportion to contributions by other ones of the more than one PSU to the shared DC electrical power and thereby avoid instability in dynamic response to a load transient induced by the power consuming component.

12 Claims, 6 Drawing Sheets

(56) References Cited

U.S. PATENT DOCUMENTS

| | | | |
|---|---|---|---|
| 8,710,810 B1* | 4/2014 | McJimsey | H02M 3/1584 |
| | | | 323/272 |
| 9,207,739 B2 | 12/2015 | Richards et al. | |
| 2002/0109487 A1* | 8/2002 | Telefus | H02M 1/10 |
| | | | 323/239 |
| 2010/0100752 A1* | 4/2010 | Chueh | G06F 1/3203 |
| | | | 713/320 |
| 2010/0141230 A1* | 6/2010 | Lukic | H02M 3/157 |
| | | | 323/283 |
| 2012/0169311 A1* | 7/2012 | Malmberg | H02J 1/102 |
| | | | 323/272 |
| 2013/0163297 A1* | 6/2013 | Phadke | G06F 1/26 |
| | | | 363/65 |
| 2014/0160814 A1* | 6/2014 | Morimoto | H02M 3/1584 |
| | | | 363/65 |
| 2014/0333270 A1* | 11/2014 | Young | G05F 1/12 |
| | | | 323/234 |
| 2015/0076910 A1* | 3/2015 | Wang | H02M 3/156 |
| | | | 307/52 |
| 2016/0224102 A1 | 8/2016 | Jenne et al. | |
| 2016/0291660 A1 | 10/2016 | Chueh et al. | |
| 2016/0345459 A1 | 11/2016 | Mills et al. | |
| 2017/0054439 A1* | 2/2017 | Sasaki | H03K 17/28 |
| 2017/0117715 A1* | 4/2017 | Muccini | H02J 5/00 |

\* cited by examiner

DIGITAL CURRENT-SHARING LOOP DESIGN OF PSUS TO ENSURE OUTPUT VOLTAGE REGULATION DURING DYNAMIC LOAD TRANSIENTS

BACKGROUND

1. Technical Field

The present disclosure relates in general to supplying regulated electrical power to an information handling system (IHS), and more particularly to balancing shared electrical current provided by master-slave coupled power supply units (PSUs) of an IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In some IHSs, multiple power supply units (PSUs) with master-slave current sharing control are placed in parallel operation in order to achieve power redundancy. The output voltage of these paralleled PSUs loses regulation, and drifts or "walks" higher during severe load transients. The issues can happen even in relatively simple PSU applications in monolithic servers. The problem is much more severe and can more easily happen in applications where a large number of PSUs are in parallel operation. In such cases, it is found that the current sharing problem tends to cause the PSU output voltage to lose regulation during dynamic load conditions. Attempts to merely mitigate the problem with increased interconnection impedance between PSUs creates additional power losses.

BRIEF SUMMARY

In one aspect of the present disclosure, an Information Handling System (IHS) includes a power consuming component that requires electrical power to operate and a power interconnect. The IHS includes multiple power supply unit (PSU)s connected in parallel via the power interconnect to convert alternating current (AC) electrical power, received from a power source, into voltage regulated, direct current (DC) electrical power. The PSUs provide the voltage regulated, local DC electrical power at a shared current output. Multiple PSUs have master-slave current sharing control to provide shared DC electrical power. The master-slave current sharing control is based in part on a shared current signal carried on the power interconnect. The shared current signal represents a current demand placed on the Multiple PSUs. The shared current signal has a delay and is driven by one PSU that supplies a highest current level among the multiple PSUs. Each PSU has an output amplifier electrically connected to the shared current output and that produces respective local DC electrical power. Each PSU has an internal current sensor that measures the local DC electrical power and provides an internal current signal representing the magnitude of the local DC electrical power. Each PSU includes a master control unit (MCU) in communication with the power interconnect, the internal current sensor, and the output amplifier. The MCU delays the internal current signal to match the delay in the shared current signal. The MCU controls the output amplifier based on the shared current signal and the delayed local current signal to maintain the respective local DC electrical power in proportion to respective contributions by other PSUs to the shared DC electrical power. Thereby, the MCU avoids instability in dynamic response to a load transient induced by the power consuming component.

In one aspect of the present disclosure, a PSU includes a power interconnect that connects to one or more other PSUs in parallel to convert AC electrical power, received from a power source, into voltage regulated, local DC electrical power. The PSU and the other PSU(s) provide a shared current output that powers a power consuming component of the IHS that requires electrical power to operate. The PSU and the other PSU(s) have master-slave current sharing control to provide shared DC electrical power, based in part on a shared current signal carried on the power interconnect. The shared current signal represents a current demand placed on the multiple PSUs. The shared current signal has a delay and is driven by one PSU that supplies a highest current level. An output amplifier is electrically connected to the shared current output and produces the local DC electrical power. An internal current sensor measures the local DC electrical power to provide an internal current signal representing the magnitude of the local DC electrical power. An MCU is in communication with the power interconnect, the internal current sensor, and the output amplifier. The MCU delays the internal current signal to match the delay in the shared current signal. The MCU controls the output amplifier based on the shared current signal and the delayed local current signal. The MCU maintains the local DC electrical power in proportion to contributions by the other PSUs to the shared DC electrical power. Thereby, the MCU avoids instability in dynamic response to a load transient induced by the power consuming component.

In one aspect of the present disclosure, a method is performed at each PSU of multiple PSUs operating in a master-slave configuration to provide electrical power to a power consuming component. The method includes receiving, by each PSU, AC electrical power from a power source. The method includes the PSU converting the AC electrical power into direct current (DC) electrical power. The method includes the PSU receiving a shared current signal carried on a power interconnect that connects each PSU to the other PSUs in parallel. The shared current signal enables master-slave current sharing control by a master controller of the PSU to produce a shared DC electrical power. The PSU provides the shared DC electrical power at a shared current output that powers a power consuming component of an IHS that requires electrical power to operate. The shared current signal represents a current demand placed on the multiple PSUs. The shared current signal has a delay and is driven by one PSU that supplies a highest current level. The method includes the PSU measuring the local DC electrical power. The method includes the PSU providing an internal current signal representing the magnitude of the local DC electrical power. The method includes the master controller of the PSU regulating the local DC electrical power by: (i) delaying the internal current signal to match the delay in the shared current signal, and (ii) controlling the output amplifier based on the shared current signal and the delayed local current signal. Consequently, the local DC electrical power is maintained in proportion to contributions by the other PSUs to the shared DC electrical power, avoiding instability in dynamic response to a load transient induced by the power consuming component.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art on examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Power supply units (PSU) provide for digital current-sharing loop control for power consuming components of an information handling system (IHS). Each PSU ensures output voltage regulation during dynamic load transients by (i) delaying an internal current signal to match a delay in a shared current signal, and (ii) controlling the output amplifier based on the shared current signal and the delayed local current signal to maintain the respective local DC electrical power in proportion to contributions by other PSUs to the shared DC electrical power. Delaying the internal current signal avoids instability in dynamic response to a load transient induced by the power consuming component. The present innovation addresses a finding that sharing current data on a current sharing bus has a slower response compared with the local current data inside each PSU during a dynamic load transition. Offsetting this delay on the current sharing bus enables maintaining voltage regulation during load transients.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
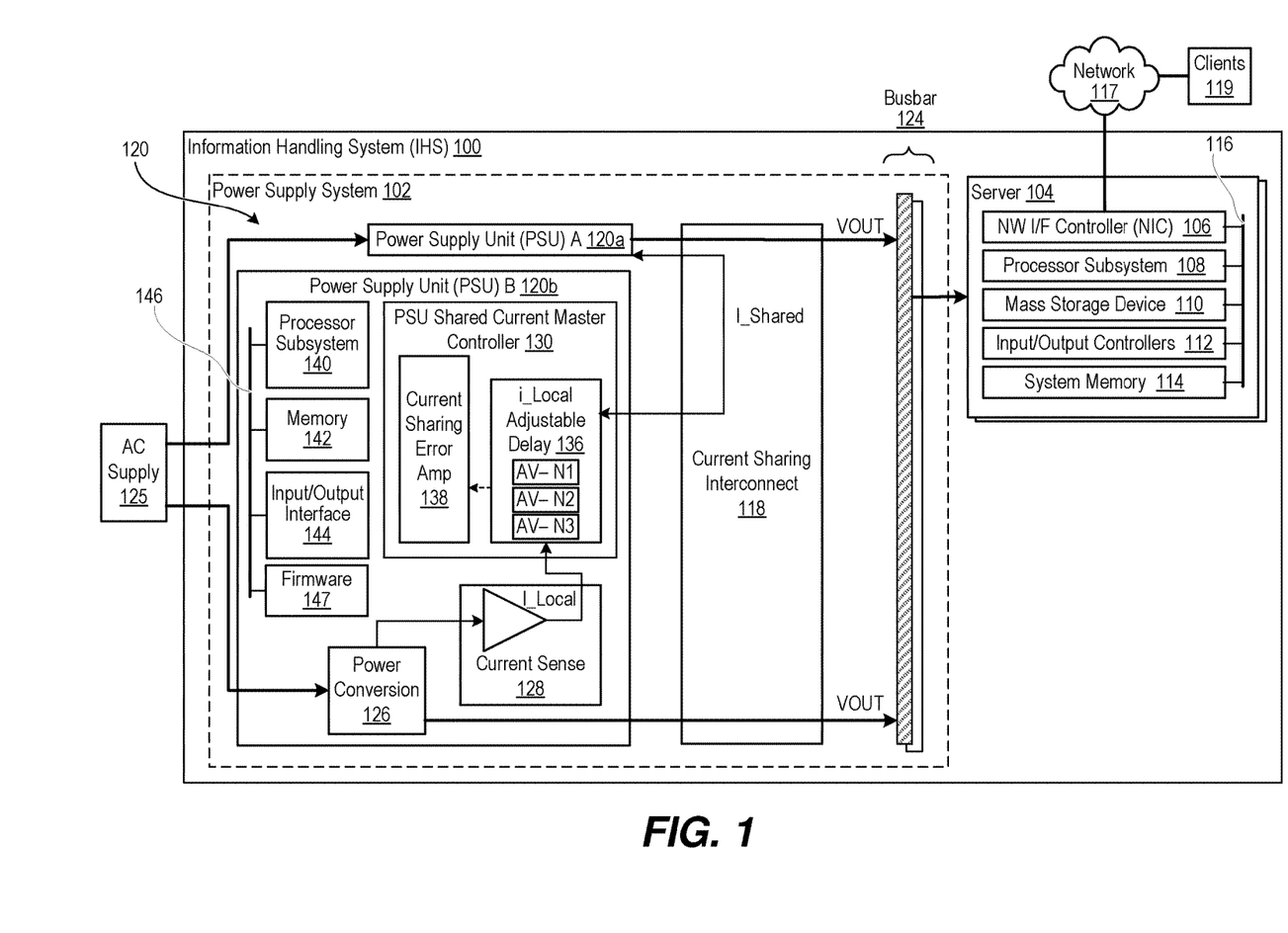
FIG. 1 illustrates a block diagram representation of an example information handling system (IHS) having computing components that are powered by a power supply system with matched response in master-slave controlled Power Supply Units (PSUs), according to one or more embodiments.

FIG. 1 illustrates a block diagram representation of an example information handling system (IHS) 100 having a power supply system 102 that provides electrical power to computing components such as servers 104. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Servers 104 of IHS 100 can include a network interface controller (NIC) 106, processor subsystem 108, mass storage device/s 110, input/output (I/O) controllers 112, and system memory 114 that are interconnected via a system interconnect 116. Processor subsystem 108 includes at least one central processing unit (CPU) coupled to the system memory 114 via the system interconnect 116. System interconnect 116 can be interchangeably referred to as a system bus, in one or more embodiments. Mass storage devices 110 can include non-volatile random access memory (NVRAM)), within which can be stored one or more software and/or firmware modules and one or more sets of data that can be utilized during operations of server 104. These one or more software and/or firmware modules can be loaded into system memory 108 during operation of server 104. Specifically, in one embodiment, system memory 108 can include therein a plurality of such modules, including one or more of firmware (F/W), basic input/output system (BIOS) or Uniform Extensible Firmware Interface (UEFI), operating system (OS), and application(s). These software and/or firmware modules have varying functionality when their corresponding program code is executed by processor subsystem 108 or secondary processing devices within respective server 104. For example, application(s) may include a word processing application, a presentation application, and a management station application, among other applications.

I/O controllers 112 support connection by and processing of signals from one or more connected input device(s), such as a keyboard, mouse, touch screen, or microphone. I/O controllers 112 also support connection to and forwarding of output signals to one or more connected output devices, such as a monitor or display device or audio speaker(s). Additionally, in one or more embodiments, one or more I/O controllers 112 can serve as device interfaces to an optical reader, a USB, a card reader, Personal Computer Memory Card International Association (PCMCIA) slot, and/or a high-definition multimedia interface (HDMI), that can be associated with IHS 100. I/O controllers 112 can be utilized to enable data to be read from or stored to corresponding removable storage device(s), such as a compact disk (CD), digital video disk (DVD), flash drive, or flash memory card. In one or more embodiments, I/O controllers 112 can further include general purpose I/O interfaces such as inter-integrated circuit (I²C), system management bus (SMB), and peripheral component interconnect (PCI) buses.

NIC 106 enables IHS 100 and/or components within IHS 100 such as server/s 104 to communicate and/or interface with other devices, services, and components that are located external to IHS 100. These devices, services, and components can interface with IHS 100 via an external network using one or more communication protocols that can include transmission control protocol/internet protocol (TCP/IP) and network block device (NBD) protocol. NIC 106 represents a communication mechanism that can enables the IHS to communicate over a network 117 with one or more externally located clients 119. Network 117 can be a local area network, wide area network, personal area network, and the like, and the connection to and/or between network 117 and IHS 100 can be wired, wireless, or a combination thereof. For purposes of discussion, network 117 can be a single collective component or can comprise one or more direct connections to other devices as well as a more complex set of interconnections as can exist within a wide area network, such as the Internet.

Power supply system 102 includes a power interconnect 118 such as a shared current bus that connects two or more other PSUs 120 in parallel. For clarity a first PSU, PSU "A" 120a, provides VOUTA and a second PSU, PSU "B" 120b, provides $VOUT_B$ that are coupled to a power distribution network such as a bus bar 124. Each PSU 120 converts AC electrical power received from a power source or AC supply 125. A power conversion component 126 of each PSU 120 converts the AC electrical power into a voltage regulated local DC electrical power (VOUT). Power conversion component 126 regulates current levels in accordance with an error signal provided by a master control unit (MCU) or master controller 130. Master controller 130 performs master-slave current sharing control to provide shared DC electrical power. The current sharing interconnect 118 provides an I_Share current signal. The I_Share current signal represents a current demand placed on the PSUs 120. The I_Share current signal has a delay and is driven by one PSU 120 that supplies a highest current level.

Each PSU 120 includes an internal current sensor 126 that measures the local DC electrical power to provide an internal current signal representing the magnitude of the local DC electrical power. In one or more embodiments, the internal current signal is a voltage that is one value within a range of possible voltages. Each voltage value represents and corresponds to a current value of the internal current. Master controller 130 delays the I_Local internal current signal to match the delay in the I_Share current signal. In one or more embodiments, the delay is deterministically or empirically set within an I_Local adjustable delay component 136. For example, three averaging components can have respective averaging time windows N1, N2, N3. The averaging delays a peak or trough in a quickly changing current demand by effectively low pass filtering the result. The I_Share current signal and delayed internal current signal are used by a current sharing error amplifier 138 to generate the error signal. The error signal controls the power conversion component 126 based on the I_Share shared current signal and the delayed local current signal to maintain the respective local DC electrical power VOUT in proportion to contributions by the other PSUs 120 to the shared DC electrical power. Delaying the internal current signal avoids instability in dynamic response to a load transient induced by the power consuming component. Each PSU 120 can include a processor subsystem 140, system memory 142 and an I/O interface 144, all interconnected via a system interconnect 146. System memory 142 includes PSU firmware 147, which executes on processor subsystem 140 to generate functions and perform certain operations. These operations perform one or more functions, such as the methods presented herein, according to aspects of the present innovation.

Figure 2:
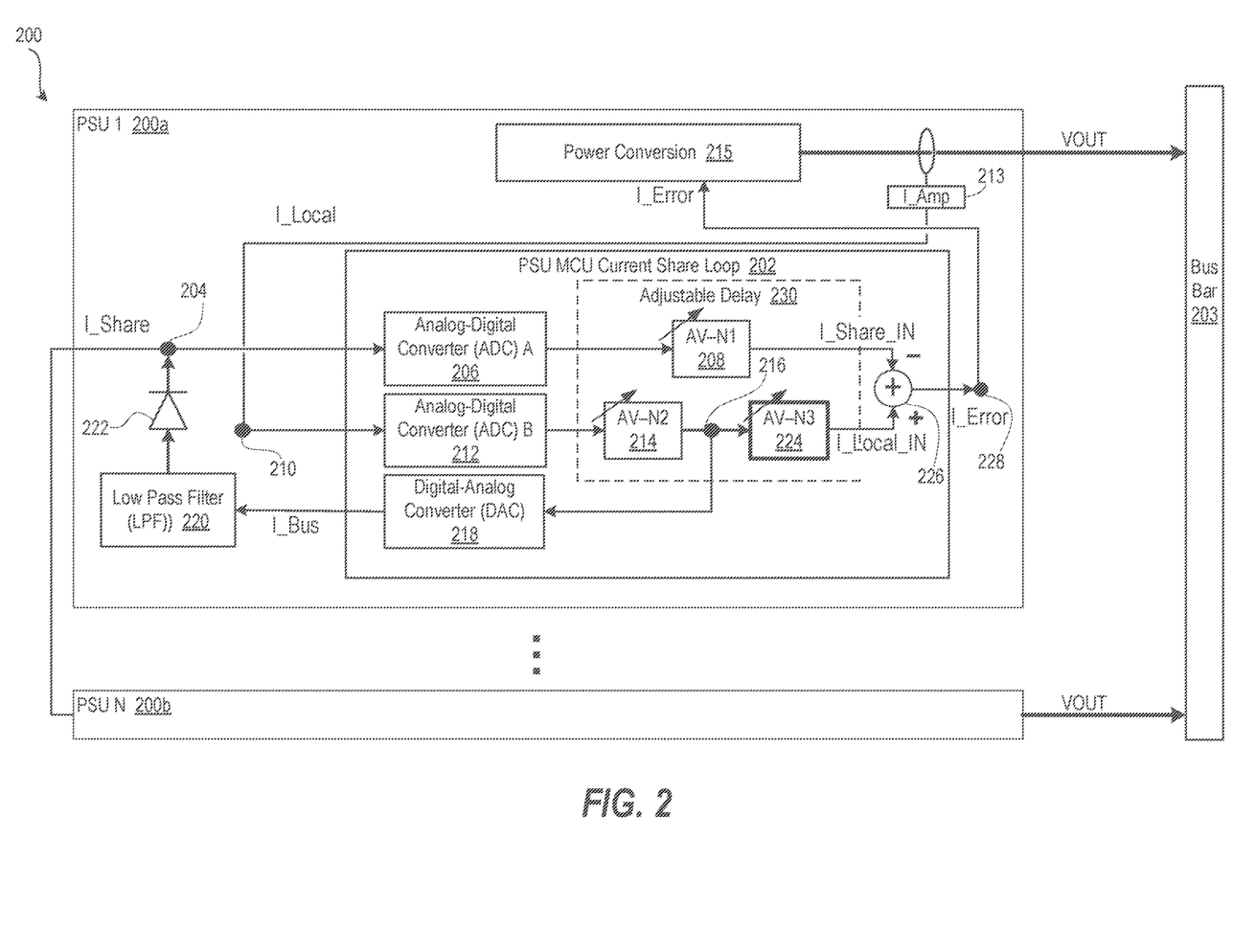
FIG. 2 illustrates a diagram of a shared current control loop of the PSU of FIG. 1, according to one or more embodiments.

FIG. 2 illustrates a first PSU 200a, which includes a PSU MCU current share loop 202 that improves response to transient loads in providing an output voltage VOUT to a bus bar 203. One or more other PSUs 200b also provide an output voltage VOUT to the bus bar 203. An input node 204 receives an I_Share signal, which is a current share bus voltage that represents the current demand to the PSUs in parallel. The I_Share signal is driven by the PSU supplying the highest current in a power supply system with multiple PSUs in parallel and with master-slave current sharing control between the PSUs. Input node 204 is coupled to an input of Analog-to-Digital Converter (ADC) "A" 206 that digitizes the I_Share signal. An output of ADC A 206 is averaged by a first averaging component 208 that has a first averaging setting N1. An output of the first averaging component 208 is I_Share_IN signal.

I_Local signal is received at node 210. I_Local signal is a voltage signal representing the magnitude of the local PSU current in PSU 200a, in parallel with other PSUs 200b. The magnitude can be a representation or value that correlates to a size of the local PSU current. Node 210 is coupled to an input of an ADC "B" 212 that digitizes the I_Local signal. The I_Local signal is an output of an internal amplifier (I_Amp) 213 that senses a current level of the output voltage VOUT from a power conversion component 215 of PSU 200a. The digitized I_Local signal is averaged by a second averaging component 214 having a second averaging setting of N2. An output of the second averaging component 214 at node 216 provides an intermediate local signal. The intermediate local signal is converted by digital-to-analog converter (DAC) 218 to generate an I_Bus signal. The I_Bus signal is filtered by a low pass filter (LPF) 220 and rectified by a rectifier 222. The filtered and rectified I_Bus signal is connected to input node 204 to add a contribution by the PSU 200a to the I_Share signal. Node 216 also provides the intermediate local signal, which is provided to an input of a third averaging component 224 that has a third averaging setting of N3. An output of the third averaging component 224 outputs an I_Local_IN signal. At a difference block 226, a difference between the I_Local_IN signal and the I_Share_IN signals provides an I_Error signal at a node 228. I_Error signal is the output of the digitally implemented current share loop 202 that is used to adjust the PSU output voltage in the MCU based PSU control firmware. Selection of the three averaging periods N1, N2, N3 for the first, second, and third averaging components 206, 212, 218 can achieve a selected one of: (i) a matched response between internal local and shared current signals; and (ii) a response time across an intended operating bandwidth of a current share loop performed by the MCU.

In one or more embodiments, an averaging block is introduced in a current-sharing control algorithm in the PSU control firmware (FW) between the two current signals (i.e. the current share bus signal (I_Share) and the local PSU current (I_Local)) and the current sharing amplifier input. The moving average block contains 3 moving average units, N1, N2 and N3, and the number of averaging of each of these 3 average units is programmable and can be adjusted to: (1) achieve a matched or balanced response time between the pair of current signals, i.e. the current share bus signal (I_Share) and the local PSU current (I_Local), at the current sharing error amplifier input; and (2) achieve certain design bandwidth or response speed of the current sharing loop. The matched response time between the signals, together with the offset in the current sharing amplifier, ensures that the current sharing loop is stable, and the phenomenon for the PSUs in parallel to fight to become master, which is the root-cause for the output voltage drifting, is successfully avoided. The presented design and method described herein are thus applicable to any PSU configuration with master-slave current sharing control.

Figure 3:
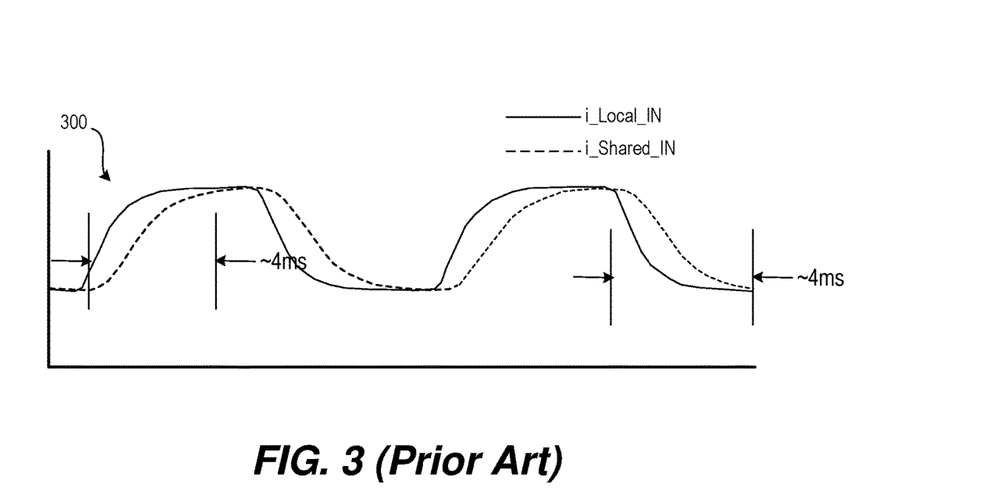
FIG. 3 illustrates a graphical plot of a conventional PSU contribution in response to a shared current signal having a delay, according to the prior art.
Figure 4:
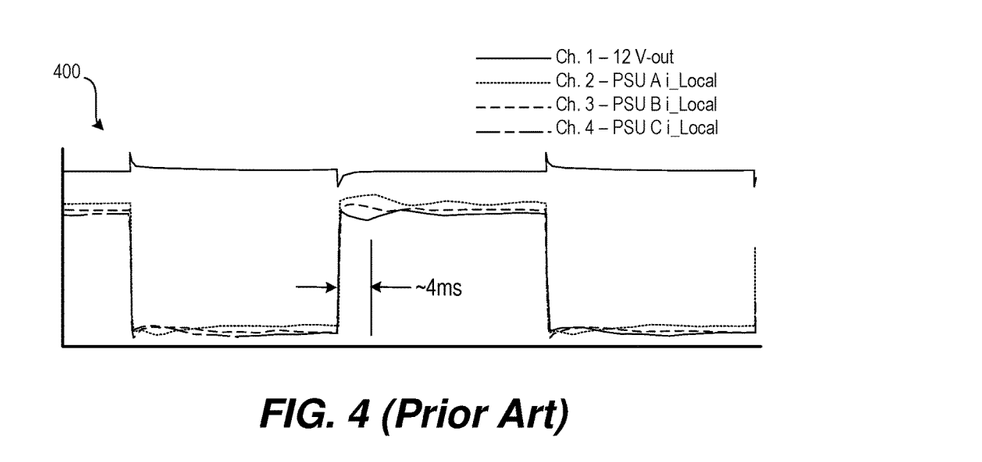
FIG. 4 illustrates a graphical plot of three conventional PSUs responding to a shared current signal having a delay, according to the prior art.

FIG. 3 illustrates a graphical plot 300 of a conventional PSU that utilizes an I_Share_IN signal that has a slower response. The two current inputs signals I_Share_IN and I_Local_IN have a large time gap in their respective responses. Each PSU would respond to this situation by acting as a master PSU to reduce output voltage, which is the wrong behavior. The first and second averaging components are set as: AV-N1=16 and AV-N2=16. FIG. 4 illustrates a graphical plot 400 of contributions of three generally-known PSUs in response to this delayed I_Share_IN signal. The respective I_Local_IN signals diverge during a first 4 ms period and then converge over a longer response time.

Figure 5:
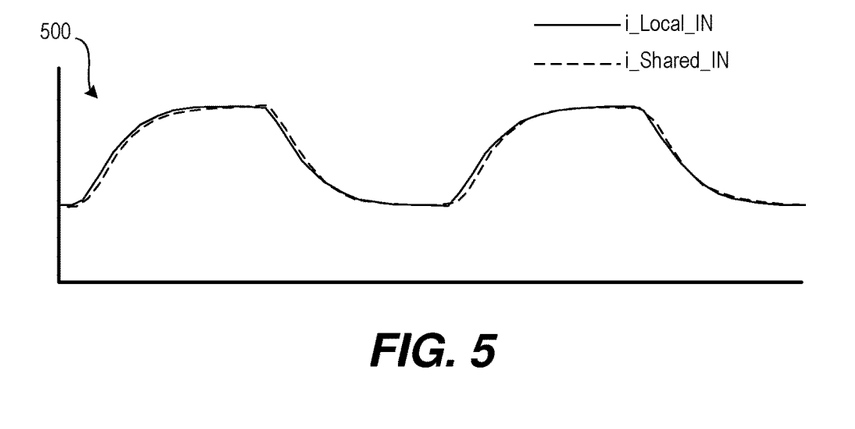
FIG. 5 illustrates a graphical plot of a PSU having a matched response to a shared current signal having a delay, according to one or more embodiments.
Figure 6:
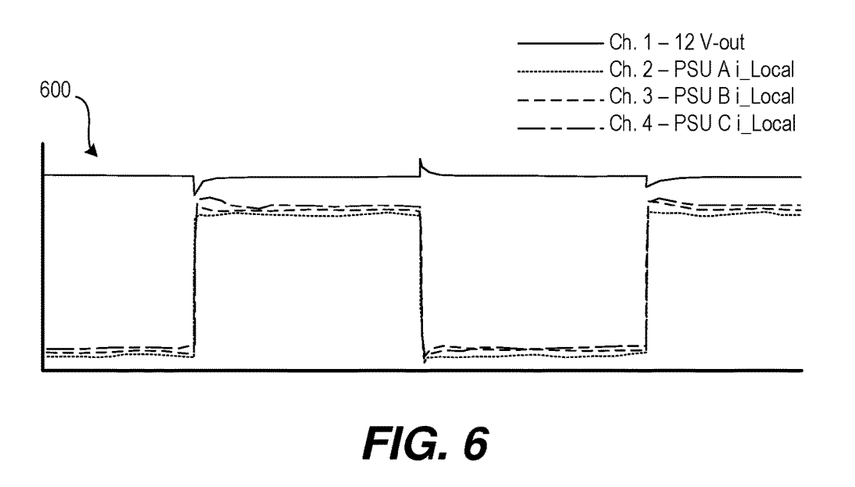
FIG. 6 illustrates a graphical plot of three PSUs having a matched response to a shared current signal having a delay, according to one or more embodiments.

FIG. 5 illustrates a graphical plot 500 of a single PSU that receives the delayed I_Share_IN signal but incorporates the third averaging block to match a response of the I_Share_IN signal. The settings for the adjustable delay are AV-N1: 2, AV-N2=0, and AV-N3=32. FIG. 6 illustrates a graphical plot 600 of three PSUs that receive the delayed I_Share_IN signal but incorporate the third averaging block to match a response of the I_Share_IN signal. The settings for the adjustable delay are AV-N1: 2, AV-N2=0, and AV-N3=32. The I_Local_IN signals do not diverge and the response time is faster, being less than 5 ms.

Figure 7:
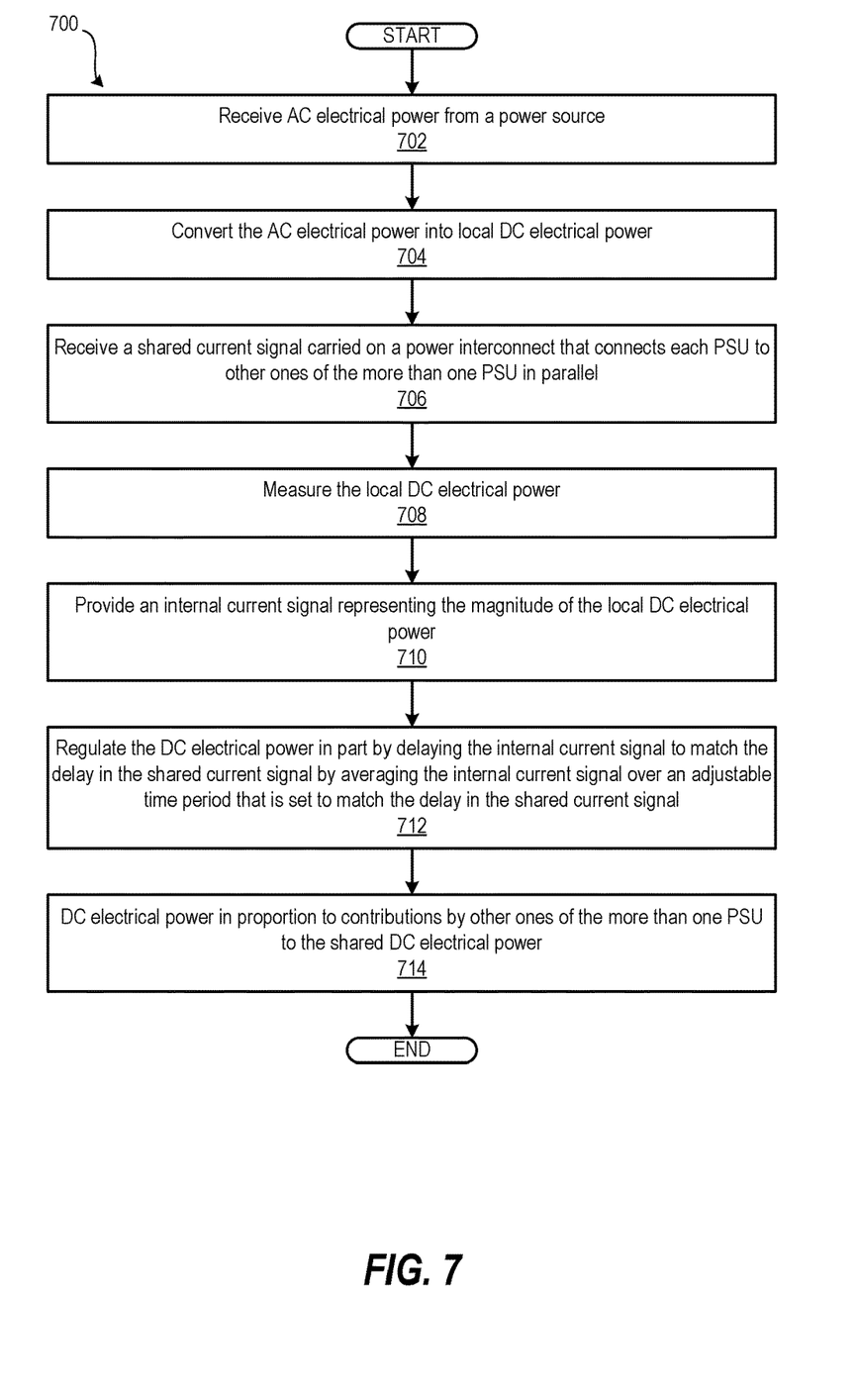
FIG. 7 illustrates a flow diagram of a method of regulating electrical power provided by parallel PSUs, according to one or more embodiments.
Figure 8:
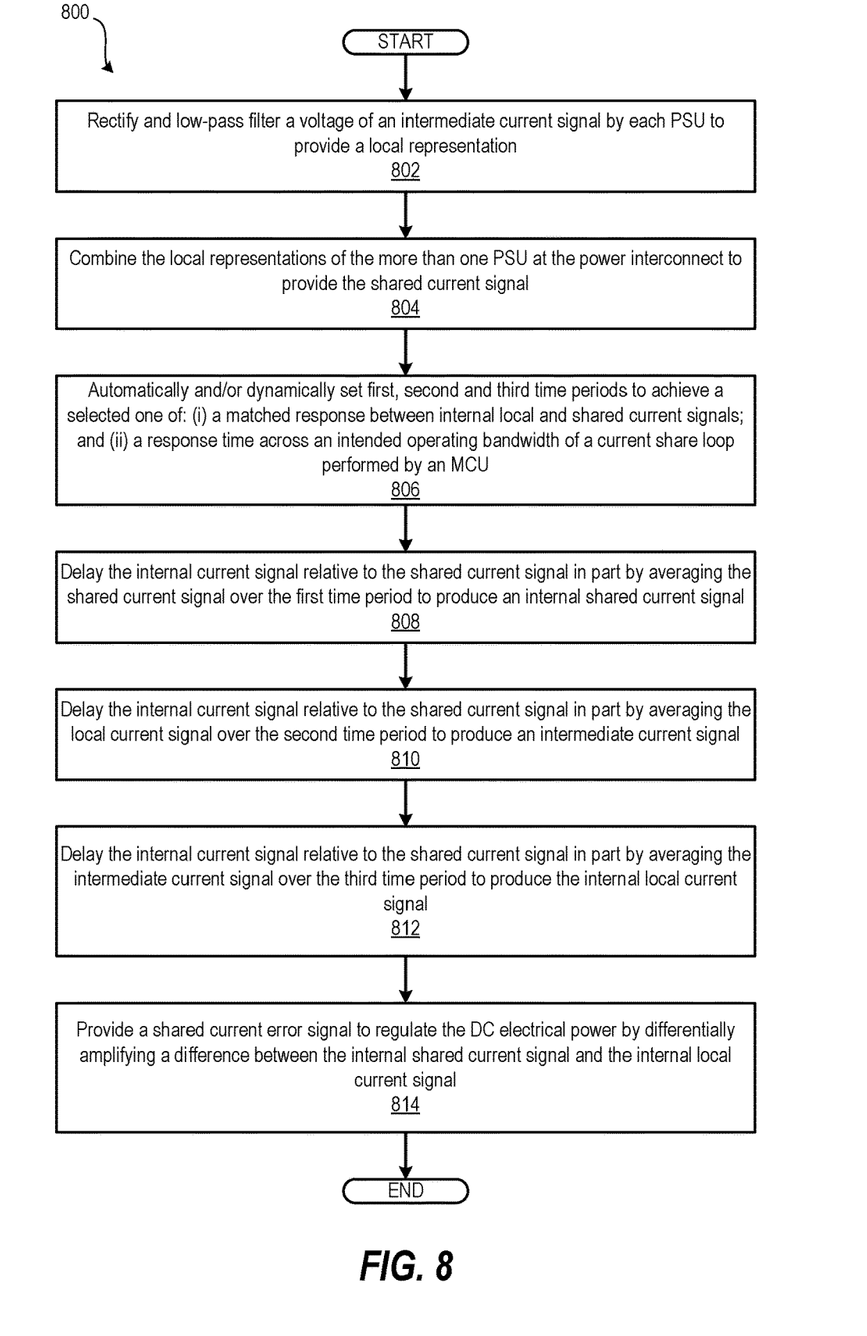
FIG. 8 illustrates a flow diagram of a method of empirically or deterministically setting a relative delay of the internal current signal to the shared current signal, according to one or more embodiments.

FIGS. 7-8 illustrate flowcharts of exemplary methods 700, 800 by which a power supply system 102 (FIG. 1) performs different aspects of the processes that enable the one or more embodiments of the disclosure. Generally, methods 700, 800 represent computer-implemented methods. The description of methods 700, 800 is provided with general reference to the specific components illustrated within FIG. 1. Generally methods 700, 800 are described as being implemented via processor subsystem 140 (FIG. 1). The methods 700, 800 perform master-slave current sharing control with matched dynamic response between shared and local current signals.

FIG. 7 illustrates a method 700 performed at each PSU 120a-120b (FIG. 1) of multiple PSUs 120a-120b (FIG. 1). A PSU 120a-120b (FIG. 1) receives AC electrical power from a power source (block 702). The PSU 120a-120b (FIG. 1) converts the AC electrical power into local DC electrical power (block 704). The PSU 120a-120b (FIG. 1) receives a shared current signal carried on a power interconnect 118 (FIG. 1) that connects each PSU 120a-120b (FIG. 1) in parallel with the other PSUs 120a-120b (FIG. 1) (block 706). The shared current signal enables master-slave current sharing control to produce a shared DC electrical power. The PSU 120a-120b (FIG. 1) provides the shared DC electrical power at a shared current output that powers a power consuming component of an IHS 100 (FIG. 1) that requires electrical power to operate. The shared current signal represents a current demand placed on the more than one PSU 120a-120b (FIG. 1) (or multiple PSUs 120a-120b (FIG. 1)). The shared current signal has a delay and is driven by one PSU 120a-120b (FIG. 1) that supplies a highest current level. The PSU 120a-120b (FIG. 1) receives a measurement of the local DC electrical power provided by the power interconnect (block 708). Method 700 includes the PSU 120a-120b (FIG. 1) providing an internal current signal representing the value of the local DC electrical power (block 710). The PSU 120a-120b (FIG. 1) regulates the local DC electrical power in part by delaying the internal current signal to match the delay in the shared current signal, by averaging the internal current signal over an adjustable time period that is set to match the delay in the shared current signal (block 712). The PSU 120a-120b (FIG. 1) controls the output amplifier based on the shared current signal and the delayed local current signal to maintain the respective local DC electrical power in proportion to contributions by the other PSUs 120a-120b (FIG. 1) to the shared DC electrical power (block 714). Thereby, the PSU 120a-120b (FIG. 1) avoids instability in dynamic response to a load transient induced by the power consuming component. Then method 700 ends.

FIG. 8 illustrates method 800 of empirically or deterministically setting a relative delay of the internal current signal to the shared current signal. In one or more embodiments, method 800 includes each PSU 120a-120b (FIG. 1) rectifying and low-pass filtering a voltage of an intermediate current signal by each PSU 120a-120b (FIG. 1) to provide a local representation (block 802). A power interconnect 118 (FIG. 1) of an IHS 100 (FIG. 1) combines the local representations of the more than one PSU 120a-120b (FIG. 1) to provide the shared current signal (block 804). A master controller 130 (FIG. 1) of the PSU 120a-120b (FIG. 1) automatically and/or dynamically sets first, second, and third time periods. The setting of the time periods achieves a selected one of: (i) a matched response between internal local and shared current signals; and (ii) a response time across an intended operating bandwidth of a current share loop 202 (FIG. 2) performed by the MCU 130 (FIG. 1) (block 806). In one or more embodiments, an original equipment manufacturer (OEM) can empirically or deterministically provision the PSU with the first, second and third time periods. The master controller 130 (FIG. 1) of the PSU delays the internal current signal relative to the shared current signal, in part by averaging the shared current signal over the first time period to produce an internal shared current signal (block 808). The master controller 130 (FIG. 1) of the PSU 120a-120b (FIG. 1) delays the internal current signal relative to the shared current signal in part by averaging the local current signal over the second time period to produce an intermediate current signal (block 810). The master controller 130 (FIG. 1) of the PSU 120a-120b (FIG. 1) delays the internal current signal relative to the shared current signal, in part by averaging the intermediate current signal over the third time period to produce the internal local current signal (block 812). The master controller 130 (FIG. 1) of the PSU 120a-120b (FIG. 1) provides a shared current error signal to regulate the local DC electrical power by differentially amplifying a difference between the internal shared current signal and the internal local current signal (block 814). Then method 800 ends.

In the above described flow charts of FIGS. 7-8, one or more of the methods may be embodied in an automated power controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:
1. An Information Handling System (IHS) comprising:
a power consuming component that requires electrical power to operate;
a power interconnect; and
more than one power supply unit (PSU) connected in parallel via the power interconnect to convert alternating current (AC) electrical power, received from a power source, into voltage regulated, shared direct current (DC) electrical power, provided at a shared current output, the more than one PSU having master-slave current sharing control to provide shared DC electrical power based in part on a shared current signal carried on the power interconnect, the shared current signal having a delay;

wherein each PSU of the more than one PSU comprises:
an output amplifier electrically connected to the shared current output and that produces respective local DC electrical power;
an internal current sensor that measures the local DC electrical power and provides a local current signal representing the magnitude of the local DC electrical power;
a master control unit (MCU) in communication with the power interconnect, the internal current sensor, and the output amplifier, and which:
delays the internal current signal to match the delay in the shared current signal; and
controls the output amplifier based on the shared current signal and the delayed local current signal to maintain the respective, local DC electrical power in proportion to contributions by other PSUs to the shared DC electrical power and thereby avoid instability in dynamic response to a load transient induced by the power consuming component;
wherein the MCU delays the local current signal by averaging the local current signal over an adjustable time period that is set to match the delay in the shared current signal.

2. The IHS of claim 1, wherein the MCU further comprises:
a first averaging module that averages the shared current signal over a first time period to produce an internal shared current signal;
a second averaging module that averages the local current signal over a second time period to produce an intermediate current signal;
a third averaging module that averages the intermediate current signal over a third time period to produce an internal local current signal; and
a shared current controller comprising a differential amplifier that produces a shared current error signal based on a difference between the internal shared current signal and the internal local current signal.

3. The IHS of claim 2, wherein the first, second, and third time periods respectively of the first, second, and third averaging modules each comprise a respective value adjusted to achieve a selected one of: (i) a matched response between internal local and shared current signals; and (ii) a response time across an intended operating bandwidth of a current share loop performed by the MCU.

4. The IHS of claim 2, wherein each PSU is connected to a conductor of the power interconnect to contribute to the shared current signal by providing a rectified and low-pass filtered voltage of the intermediate current signal.

5. A power supply unit (PSU) comprising:
a power interconnect that connects to one or more other PSUs in parallel to convert alternating current (AC) electrical power, received from a power source, into voltage regulated, direct current (DC) electrical power, provided at a shared current output that powers a power consuming component of an information handling system (IHS) that requires electrical power to operate, the PSU and one or more other PSUs having master-slave current sharing control to provide shared DC electrical power based in part on a shared current signal carried on the power interconnect, the shared current signal having a delay;
an output amplifier electrically connected to the shared current output and that produces respective, local DC electrical power;
an internal current sensor that measures the local DC electrical power to provide a local current signal representing the magnitude of the local DC electrical power;
a master control unit (MCU) in communication with the power interconnect, the internal current sensor, and the output amplifier, and which
delays the local current signal to match the delay in the shared current signal; and
controls the output amplifier based on the shared current signal and the delayed local current signal to maintain the respective local DC electrical power in proportion to contributions by the one or more other PSUs to the shared DC electrical power and thereby avoiding instability in dynamic response to a load transient induced by the power consuming component;
wherein the MCU delays the local current signal by averaging the internal current signal over an adjustable time period that is set to match the delay in the shared current signal.

6. The PSU of claim 5, wherein the MCU further comprises:
a first averaging module that averages the shared current signal over a first time period to produce an internal shared current signal;
a second averaging module that averages the local current signal over a second time period to produce an intermediate current signal;
a third averaging module that averages the intermediate current signal over a third time period to produce an internal local current signal; and
a shared current controller comprising a differential amplifier that produces a shared current error signal based on a difference between the internal shared current signal and the internal local current signal.

7. The PSU of claim 6, wherein the first, second and third time periods respectively of the first, second, and third averaging modules each comprise a respective value adjusted to achieve a selected one of: (i) a matched response between internal local and shared current signals; and (ii) a response time across an intended operating bandwidth of a current share loop performed by the MCU.

8. The PSU of claim 6, wherein each PSU is connected to a conductor of the power interconnect to contribute to the shared current signal component by providing a rectified and low-pass filtered voltage of the intermediate current signal.

9. A method comprising:
at each power supply unit (PSU) of more than one PSU:
receiving alternating current (AC) electrical power from a power source;
converting the AC electrical power into direct current (DC) electrical power;
receiving a shared current signal carried on a power interconnect that connects each PSU to other ones of the more than one PSU in parallel, the shared current signal for master-slave current sharing control to produce a shared DC electrical power provided at a shared current output that powers a power consuming component of an information handling system (IHS) that requires electrical power to operate, the shared current signal having a delay;
measuring the local DC electrical power;
providing a local current signal representing the magnitude of the local DC electrical power; and
regulating the local DC electrical power by: (i) delaying the local current signal to match the delay in the shared current signal, and (ii) controlling the output amplifier based on the shared current signal and the delayed local current signal to maintain the respective, local DC electrical power in proportion to contributions by other ones of the more than one PSU to the shared DC electrical power and thereby avoiding instability in dynamic response to a load transient induced by the power consuming component;

wherein delaying the local current signal comprises averaging the local current signal over an adjustable time period that is set to match the delay in the shared current signal.

10. The method of claim 9, wherein delaying the local current signal comprises:

averaging the shared current signal over a first time period to produce an internal shared current signal;

averaging the local current signal over a second time period to produce an intermediate current signal;

averaging the intermediate current signal over a third time period to produce an internal local current signal; and providing a shared current error signal to regulate the local DC electrical power by differentially amplifying a difference between the internal shared current signal and the internal local current signal.

11. The method of claim 10, further comprising respectively selecting the first, second and third time periods to achieve a selected one of: (i) a matched response between internal local and shared current signals; and (ii) a response time across an intended operating bandwidth of a current share loop performed by the MCU.

12. The method of claim 10, wherein receiving the shared current signal further comprises:

rectifying and low-pass filtering a voltage of the intermediate current signal by each PSU to provide a local representation; and combining the local representations of the more than one PSU at the power interconnect to provide the shared current signal.

* * * * *